J. W. JONES.
COMBINED ROAD MAP AND ODOMETER.
APPLICATION FILED AUG. 6, 1909.

1,040,345.

Patented Oct. 8, 1912.

2 SHEETS—SHEET 1.

Witnesses:
M. A. Wood.
R. C. Fitzhugh.

Joseph W. Jones, Inventor
By his Attorneys
Mauro Cameron Lewis & Massie

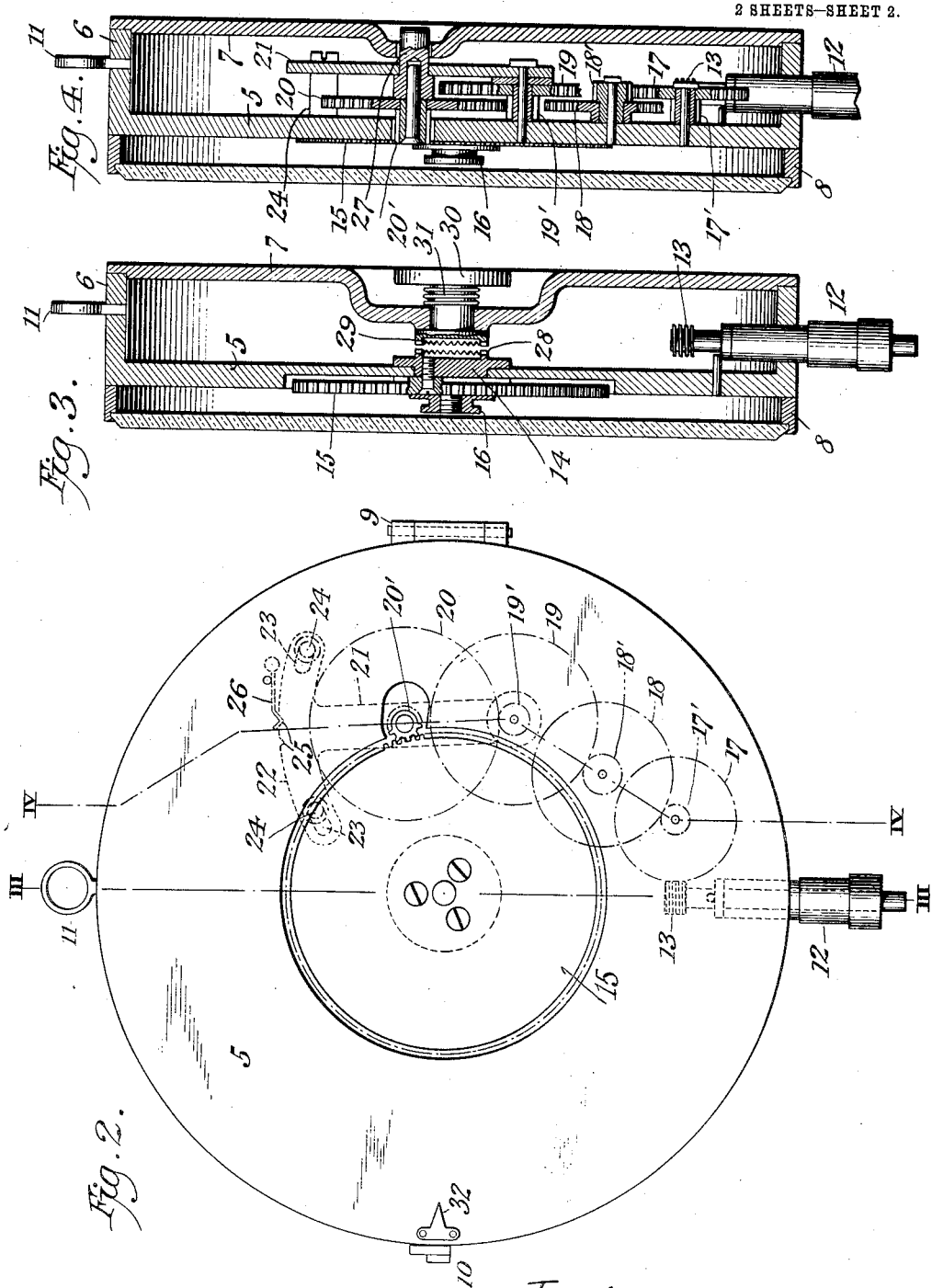

UNITED STATES PATENT OFFICE.

JOSEPH W. JONES, OF NEW YORK, N. Y.

COMBINED ROAD-MAP AND ODOMETER.

1,040,345.  Specification of Letters Patent.  Patented Oct. 8, 1912.

Application filed August 6, 1909. Serial No. 511,578.

*To all whom it may concern:*

Be it known that I, JOSEPH W. JONES, a citizen of the United States of America, and a resident of New York city, New York, have invented a new and useful Improvement in Combined Road-Maps and Odometers, which improvement is fully set forth in the following specification.

My invention is designed to enable the automobilist to ascertain how far along on his journey he is, and to keep him posted generally as to the route; to enable him to know how many miles he has already traveled and how many more remain to be traveled to reach his destination (or any other point on the route); to enable any occupant of the vehicle, even on a rear seat, to obtain the same information; and to enable the automobilist to make his own chart as he goes over a new route, or to substitute a new chart when desired.

To this end, the invention comprises broadly a portable device containing an interchangeable road-chart, or blank chart, with means for propelling the chart at a rate proportionate to the travel of the vehicle,—the device being so constructed and arranged that it can be passed along from hand to hand or readily disposed of.

The invention comprises further the road-map or chart, and certain details of construction and arrangement that will be hereinafter pointed out and claimed.

The invention will be best understood by reference to the annexed drawings in which—

Figure 1:
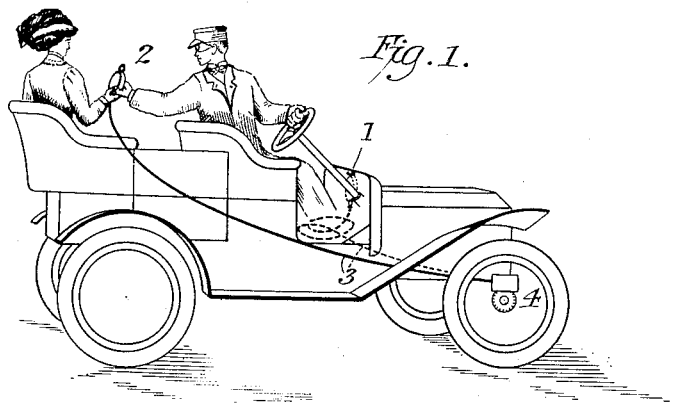
Figure 5:
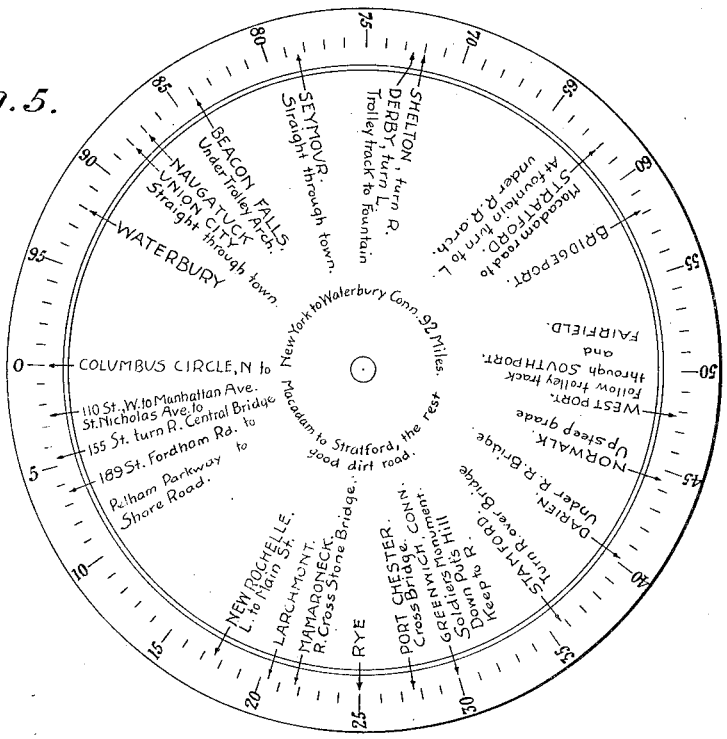

Figure 1 is a perspective indicating the manner of making use of my combined road-map and odometer; Fig. 2 is a plan view of the operative mechanism, with the map or chart removed therefrom; Fig. 3 is a transverse section through line III—III of Fig. 2; Fig. 4 is a similar view, through line IV—IV of Fig. 2; Fig. 5 is a plan of an interchangeable chart.

Referring to Fig. 1, the device as a whole may be hung on a hook 1 on the dash, as indicated by dotted lines, or it may be passed to an occupant in the rear seat as at 2, this being permitted by the flexible shafting 3, which is more flexible than usual and of sufficient length to reach to any part of the vehicle. This flexible shafting is driven in any convenient manner, as by a gear-wheel secured to one of the front wheels of the automobile, and inclosed in a casing as shown at 4.

The operating parts are inclosed within a cylindrical casing, box, or support consisting of the circular plate 5 having a shallow circular wall 6, and a detachable back or bottom 7 which latter is normally secured thereto.

8 is a ring having a glass plate to constitute the cover, hinged to the front or top of the box at 9 and having a fastening at 10.

11 is an eye secured to the box for hanging the apparatus up.

12 is a sleeve mounted in the circular wall 6, for carrying a shaft that is connected with the flexible shafting 3 (see Fig. 1), said shaft terminating in a gear 13, preferably a worm.

Plate 5 is the support for most of the operating parts. Journaled centrally in this plate is the arbor 14; on top of which is secured the large gear 15, that constitutes the turn-table, preferably located within a recess on the upper side of plate 5. A clamp-nut 16 is adapted to be screwed down upon top of the turn-table 15, for holding in place the chart or road-map shown in Fig. 5. A train of reduction-gearing is interposed between worm 13 and large gear or turn-table 15. This train comprises the gear 17 in mesh with the worm 13 and carrying small pinion 17′; the latter meshes with gear 18 which carries small pinion 18′, that in turn meshes with gear 19 which carries small pinion 19′; and the latter meshes with gear 20 which carries small pinion 20′, which last extends through a slot in plate 5, so as to mesh with the large gear 15. The revolution of the turn-table with its chart or map will bear a fixed relation to the movement of the automobile or other vehicle; and preferably it will require precisely one hundred (100) miles of travel to make one (1) complete revolution of the turn-table 15 and its chart.

I prefer to provide means for throwing the turn-table into and out of gear, and for adjusting the chart with reference to the actual position of the automobile at the time. The drawings show a convenient construction for this purpose. 21 is a lever mounted upon the axis of the gear and pinion 19—19′, and the gear and pinion 20—20′ are journaled upon this lever. At the end of this lever is a plate 22, provided with (curved) guide-slots 23 that receive guide-pins 24 which depend from plate 5, and likewise provided with two seats 25. A spring-catch 26 is secured to plate 5 and adapted to enter either notch 25, for holding the lever 21 in either of the two positions indicated. A post 27 protrudes from lever 21 through the back-plate 7, for shifting the lever and thereby throwing pinion 20' into or out of engagement with large gear 15. Preferably this post will constitute the journal bearing for the gear and pinion 20—20' (see Fig. 4). At the bottom of arbor 14 is the crown-ratchet 28; and adjacent thereto is a corresponding crown-ratchet 29 carried by the headed post or shaft 30 that protrudes through back-plate 7, in which it is journaled. The two crown-ratchets 28—29 constitute a clutch; and a spring 31 serves to hold them out of engagement.

Preferably the bottom plate 7 will be concaved around post 27 and around post 30, so that they, although protruding through the back, will not extend beyond its plane (see Figs. 3 and 4).

To insert and adjust any chart, release catch 10 and raise cover 8, remove clamp-nut 16 and insert the desired road-chart; then replace nut 16, and close and fasten cover 8; then manipulate post 27 so as to disengage the train from gear 15, press post 30 into engagement with the turn-table, and then rotate it until that portion of the chart which corresponds to the present location of the automobile is brought opposite the pointer 32,—whereupon post 30 is released (spring 31 forcing it back), and post 27 is restored to the position of engagement. The apparatus will be in proper adjustment for use.

There will be as many different charts as desired, one for each route or road. The chart will be a disk preferably of paper or other suitable material, having a central hole for passing over the stud of the turn-table; and around its periphery will be a scale of miles indicated by equidistant markings, with the names of localities placed adjacent the corresponding portions of the scale, together with other remarks. One illustration is found in Fig. 5, which indicates a favorite route from Columbus Circle in New York city to Waterbury, Connecticut. Many thicknesses of such charts may be placed upon the turn-table, but only the topmost one appearing. Assuming that the trip is to be from Columbus Circle to Waterbury, the chart shown in Fig. 5 will be inserted, and by manipulating the posts 27 and 30, the zero point on the chart (opposite "Columbus Circle") will be brought beneath the pointer 32, and the apparatus will be ready for work. As the vehicle proceeds along its way, the pointer 32 will always indicate with sufficient accuracy the precise location of the vehicle at the time, the chart containing as many notations and directions as may be desired. The apparatus may be hung up on the dash, at 1; or it may be laid on the floor or seat, or passed back to passengers in the rear seat for inspection.

Instead of having an already-prepared chart as shown in Fig. 5, the automobilist may insert a perfectly plain chart, having only the scale of miles around its periphery, and will then prepare his own chart as he goes over the route, writing upon the chart, at the proper positions, the names of the various places along the route, with any remarks that may seem desirable. In this way he makes his own chart, and can either keep it for further use, or have copies thereof printed for distribution among his friends.

I have described the construction of a preferred embodiment of my invention with some detail, but only for the sake of clearness.

Other mechanism might be employed for driving the chart, the particular construction for adjusting the position of the chart might be varied or even omitted, and other forms of chart than that shown in Fig. 5 might be employed, without in any case departing from the spirit of my invention, which, broadly stated, comprises the portable combined road-map and odometer which is not stationarily mounted but may be passed around from hand to hand, and may be readily supplied with different charts.

Having thus described my invention, I claim:

1. The combination of a casing; a turn-table mounted upon said casing; a map or chart in the form of a disk detachably mounted upon said turn-table; driving gearing or connections in said casing for rotating the turn-table and adapted to permit independent manual rotation of the turn-table in adjusting the position of the chart or map; power connections for actuating said driving gearing from the wheel of a vehicle; and a shaft for rotating said turn-table independently of said power connections to adjust the position of the map or chart, said shaft having at one end a clutch for making connection to the turn-table and at its other end means to be gripped to manually rotate the shaft.

2. The combination of a casing; a turn-table mounted upon said casing; a map or chart in the form of a disk detachably mounted upon said turn-table; driving gearing or connections in said casing for rotating the turn-table and adapted to permit independent manual rotation of the turn-table in adjusting the position of the chart or map; power connections for actuating said driving gearing from the wheel of a vehicle; a shaft for rotating said turn-table independently of said power connections to adjust the position of the map or chart, said shaft being movable and having at one end a clutch adapted by movement of the shaft to be brought into connection with the turn-table; means at the other end of the shaft adapted to be gripped to manually rotate the shaft; and a spring normally holding said shaft in position to render said clutch inactive.

In testimony whereof I have signed this specification in the presence of two subscribing witnesses.

JOSEPH W. JONES.

Witnesses:
C. A. L. MASSIE,
RALPH L. SCOTT.